(12) United States Patent
Kawada

(10) Patent No.: US 8,422,369 B2
(45) Date of Patent: Apr. 16, 2013

(54) TRANSMISSION AND RECEPTION SYSTEM, TRANSMITTER, TRANSMISSION METHOD, RECEIVER, RECEPTION METHOD, AND PROGRAM

(75) Inventor: Masato Kawada, Tokyo (JP)

(73) Assignee: Sony Corporation, Tokyo (JP)

( * ) Notice: Subject to any disclaimer, the term of this patent is extended or adjusted under 35 U.S.C. 154(b) by 947 days.

(21) Appl. No.: 11/381,322

(22) Filed: May 2, 2006

(65) Prior Publication Data

US 2006/0259844 A1    Nov. 16, 2006

(30) Foreign Application Priority Data

May 13, 2005    (JP) ................................. 2005-140694

(51) Int. Cl.
  *G01R 31/08*    (2006.01)
  *H04L 12/28*    (2006.01)
(52) U.S. Cl.
  USPC .......................................... 370/235; 370/384
(58) Field of Classification Search .................. 370/235, 370/394
  See application file for complete search history.

(56) References Cited

U.S. PATENT DOCUMENTS

| | | | | |
|---|---|---|---|---|
| 5,222,061 | A * | 6/1993 | Doshi et al. .................... | 370/394 |
| 7,164,680 | B2 * | 1/2007 | Loguinov ....................... | 370/394 |
| 7,180,896 | B1 * | 2/2007 | Okumura ....................... | 370/394 |
| 2002/0191594 | A1 * | 12/2002 | Itoh et al. ....................... | 370/352 |
| 2005/0053093 | A1 * | 3/2005 | Fukushima et al. ........... | 370/468 |
| 2005/0251721 | A1 * | 11/2005 | Ramesh et al. ................ | 714/748 |

FOREIGN PATENT DOCUMENTS

| | | |
|---|---|---|
| JP | HEI 04-179340 | 6/1992 |
| JP | HEI 10-178500 | 6/1998 |
| JP | 2000228676 | 8/2000 |
| JP | 2001-103041 | 4/2001 |
| JP | 2001119437 | 4/2001 |
| JP | 2003-087349 | 3/2003 |
| JP | 2004-215199 | 7/2004 |
| JP | 2005-102073 | 4/2005 |
| WO | WO/01/99355 | * 12/2001 |
| WO | W002/30067 | 4/2002 |

OTHER PUBLICATIONS

Wiley, John , Programming with Class: A Practical Introduction to Object Oriented Programming with C++,1994, pp. 1-6.*
Japanese Office Action issued Jan. 18, 2011, corresponding to Japanese Appln. No. 2005-140694.

* cited by examiner

*Primary Examiner* — Mark Rinehart
*Assistant Examiner* — Angel Brockman
(74) *Attorney, Agent, or Firm* — K&L Gates LLP

(57) ABSTRACT

A transmission and reception system is provided. Based on sequence numbers stored in a normal packet information storage unit, a sequence control unit provides normal packets stored in a transmission buffer with sequence numbers so as to be consecutive to a sequence number of the most recently transmitted normal packet. The transmission unit uses a transmission rate to select a normal packet or a retransmission packet. The transmission unit assigns a sequence number to the selected packet and transmits it. The normal packet information storage unit stores numbers assigned to the normal packets transmitted by the transmission unit. The invention can be applied to a transmission system that transmits data.

8 Claims, 11 Drawing Sheets

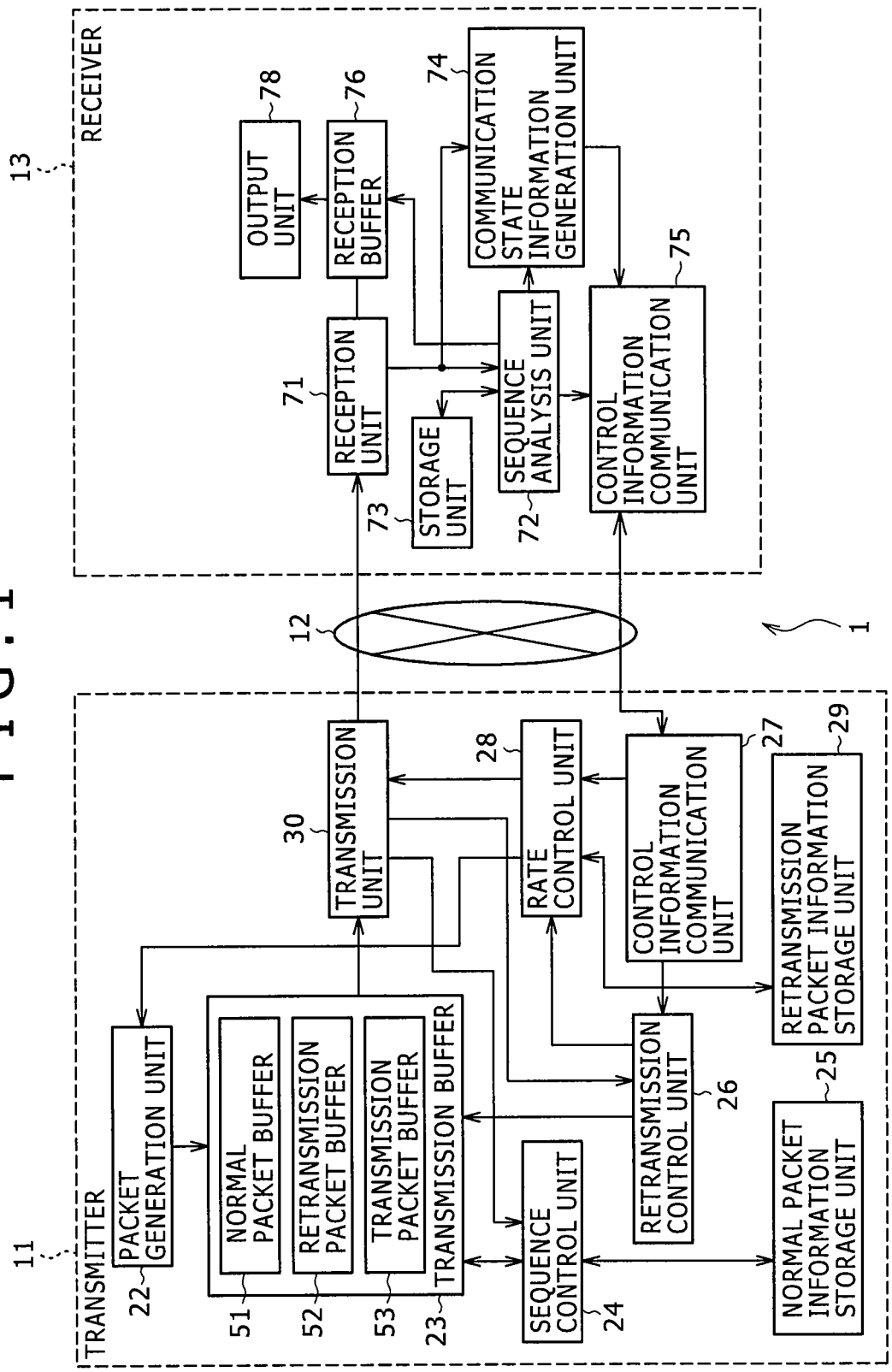

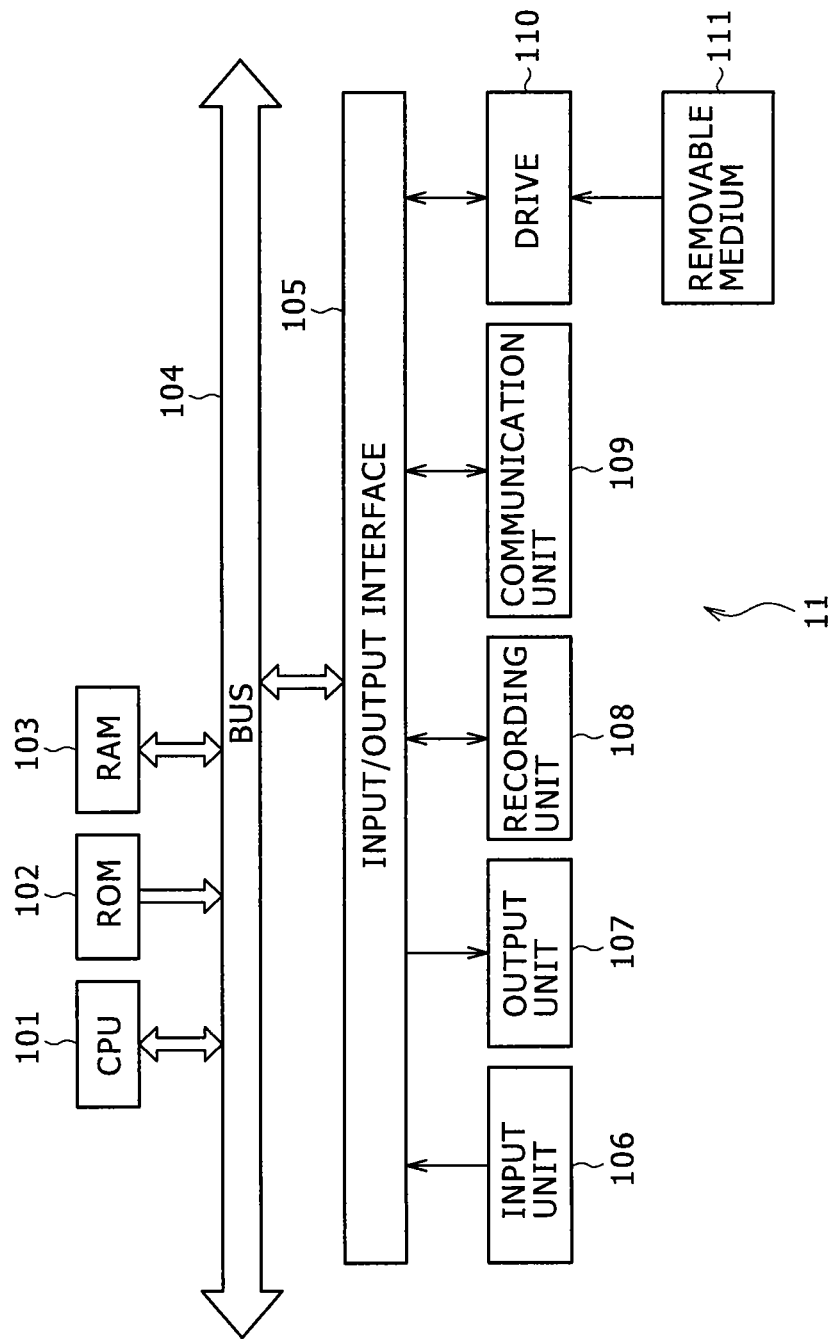

FIG.5

| 53 | | | | | | |
|---|---|---|---|---|---|---|
| SEQUENCE NUMBER | 24 | 23 | ~~18~~ | ~~22~~ | 21 | 16 |

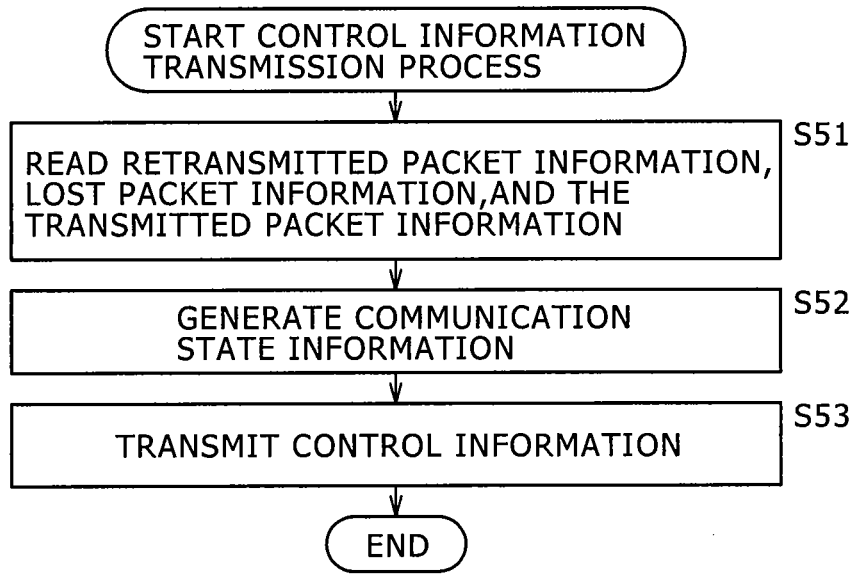
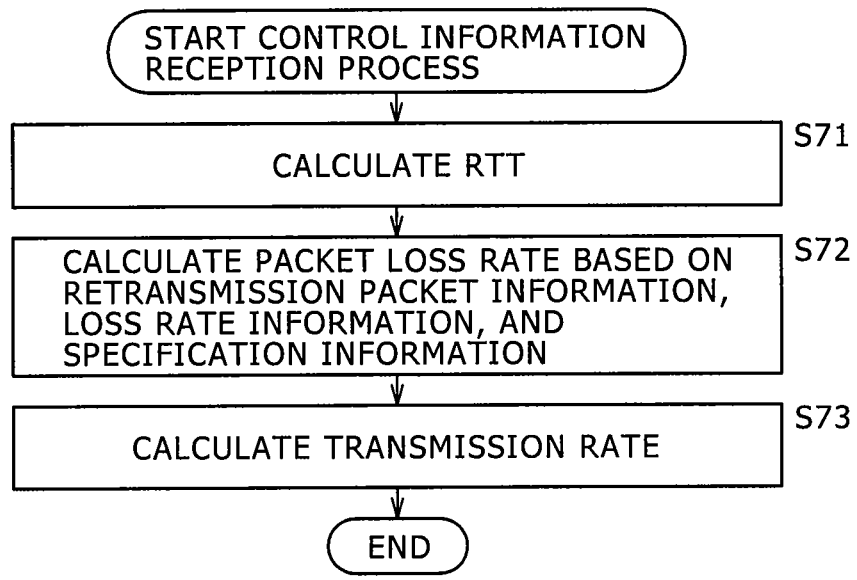

TRANSMISSION AND RECEPTION SYSTEM, TRANSMITTER, TRANSMISSION METHOD, RECEIVER, RECEPTION METHOD, AND PROGRAM

CROSS REFERENCES TO RELATED APPLICATIONS

The present application claims priority to Japanese Patent Application JP 2005-140694 filed in the Japanese Patent Office on May 13, 2005, the entire contents of which being incorporated herein by reference.

BACKGROUND

The present application relates to a transmission and reception system, a transmitter, a transmission method, a receiver, a reception method, and a program. More specifically, the invention relates to a transmission and reception system, a transmitter, a transmission method, a receiver, a reception method, and a program capable of preventing congestion from occurring and transmission rates from degrading due to data retransmission.

In order to realize streaming reproduction and realtime transmission during transmission of audiovisual data, it is desirable to use RTP (Real-time Transport Protocol) specified in RFC (Request For Comment) 1889 and provide transmission control in accordance with packet sequences or time stamps.

Generally, a data transmission network is subject to a packet loss due to congestion or errors and variations in available transmission rates due to the network's physical bands or congestion. In order to ensure and improve the reproduction quality of received data in such situation, it is necessary to control transmission rates corresponding to data coding rates and network's available bands and to control retransmission of lost packets.

Generally, the transmission rate control technique using the RTP allows a receiver to monitor sequence numbers attached to RTP packets, detect a packet loss based on the sequence numbers, and calculate the transmission rate according to a packet loss rate and a transmission delay (RTT (Round Trip Time)).

The transmission rate control techniques using the RTP include TFRC (TCP-Friendly Rate Control) specified in RFC3448. Another control technique takes radio communication states into consideration based on TFRC.

According to a retransmission control technique in consideration for the realtime property of data (e.g., JP-A No. 119437/2001), a receiver to receive data packets detects a lost packet based on the missing sequence number attached to the packet and requests retransmission of the packet. Out of packets requested for retransmission, a transmitter to transmit packets selects and retransmits a packet that will reach the receiver by the time to retransmit the packet.

According to another technique (e.g., International Publication 02/30067), a receiver to receive data packets detects loss of a highly prioritized packet based on multiple priorities assigned to the packets and requests retransmission of that packet.

However, there may be a case where the above-mentioned transmission rate control technique is performed simultaneously with the retransmission control technique described in patent document 1 or 2. In such case, a packet targeted for retransmission is transmitted independently of the transmission rate control. The transmitter may transmit both a packet to be retransmitted (hereafter referred to as a retransmission packet) and an untransmitted packet (hereafter referred to as a normal packet). The total transmission amount (the data amount of retransmission packets and normal packets) may exceed the transmission rate calculated according to the transmission rate control technique and may cause further packet loss.

In the following description, retransmission packets and normal packets are generically referred to simply as packets when there is no need for distinction between them.

Since the retransmission packet is transmitted independently of the transmission rate control, the transmission rate control does not manage sequence numbers attached to the retransmission packets. As a result, an error may occur in the amount of received packets the receiver detects based on the sequence numbers. There may be a possibility of failing to accurately calculate a packet loss rate used for the transmission rate calculation.

Yet another technique is proposed to prevent a transmission rate from increasing due to retransmission packets (e.g., JP-A No. 228676/2000). According to this technique, an intermediate apparatus is provided between the transmitter and the receiver. The intermediate apparatus references priorities of retransmission packets and those of normal packets and omits the normal packets equivalent to the retransmission packets.

According to the technique described in patent document 3, however, omitting the normal packets loses the continuity of sequence numbers for the subsequent normal packets. Even when no packet is lost, the receiver detects a lost packet based on the sequence numbers. This results in a decrease in the transmission rate calculated by using a loss rate of packets (packet loss rate).

When the intermediate apparatus omits packets, their sequence numbers can be rewritten so as to be sequential, thus maintaining the continuity of sequence numbers for the subsequent normal packets. However, there is a difference between sequence numbers provided for normal packets by the transmitter and normal packets' sequence numbers received by the receiver. Accordingly, there is a difference between two types of sequence numbers. One is the sequence number assigned to a normal packet whose loss the receiver detects to request retransmission for that packet. The other is the sequence number the transmitter assigns to a normal packet and maintains it. In this manner, it is difficult for the transmitter to accurately retransmit the packet requested for retransmission.

The invention addresses the above-identified. It is desirable to be able to prevent congestion from occurring and transmission rates from degrading due to data retransmission.

SUMMARY

In a transmission and reception system according to an embodiment of the invention, a transmitter includes: packet storage means for storing an untransmitted packet and a retransmission-requested packet as transmission-scheduled packets; number provision means for providing a number for identifying a transmission sequence of the packet to the untransmitted packet out of transmission-scheduled packets stored in the packet storage means; information reception means for receiving specification information for the receiver to specify the retransmission-requested packet; retransmission control means for allowing the packet storage means to store the retransmission-requested packet based on the specification information; packet transmission means for selecting a transmission-scheduled packet stored in the packet storage means based on a specified transmission rate and transmitting the selected packet provided with the number; number storage means for storing the number provided to a packet transmitted by the packet transmission means; and removal means for removing the transmission-scheduled packet not transmitted by the packet transmission means from the packet storage means; wherein the number provision means uses a number stored in the number storage means to provide the number to an untransmitted packet stored in the packet storage means by the removal means after removing a packet so that the provided number is consecutive to a number of a packet different from the most recently transmitted retransmission-requested packet. A receiver includes: packet reception means for receiving a packet transmitted by the packet transmission means; detection means for using a number provided to a packet received by the packet reception means to detect a loss of the packet; and information transmission means for transmitting to the transmitter the specification information designating a packet whose loss is detected by the detection means.

A transmitter according to an embodiment includes: packet storage means for storing an untransmitted packet and a retransmission-requested packet as transmission-scheduled packets; number provision means for providing a number for identifying a transmission sequence of the packet to the untransmitted packet out of transmission-scheduled packets stored in the packet storage means; information reception means for receiving specification information for the receiver to specify the retransmission-requested packet; retransmission control means for allowing the packet storage means to store the retransmission-requested packet based on the specification information; packet transmission means for selecting a transmission-scheduled packet stored in the packet storage means based on a specified transmission rate and transmitting the selected packet provided with the number; number storage means for storing the number provided to a packet transmitted by the packet transmission means; and removal means for removing the transmission-scheduled packet not transmitted by the packet transmission means from the packet storage means, wherein the number provision means uses a number stored in the number storage means to provide the number to an untransmitted packet stored in the packet storage means after removing a packet by the removal means so that the provided number is consecutive to a number of a packet different from the most recently transmitted retransmission-requested packet.

The transmitter can be further provided with priority sequence provision means for providing a transmission priority sequence to the untransmitted packet, wherein the removal means can preferentially remove the transmission-scheduled packet with a low priority sequence provided by the priority sequence provision means.

The transmitter can be further provided with determination means for determining a transmission rate, wherein the information reception means can also receive loss information about a loss of the packet from the receiver; wherein the determination means can determine the transmission rate based on loss information received by the information reception means; and wherein the packet transmission means can select the packet based on a transmission rate determined by the determination means.

The determination means can determine the transmission rate based on the loss information and a number stored in the number storage means.

A transmission method according to an embodiment includes the steps of: allowing the packet storage means to store the untransmitted packet and a retransmission-requested packet as transmission-scheduled packets; providing a number for identifying a transmission sequence of the packet to the untransmitted packet out of transmission-scheduled packets stored in the packet storage means; receiving specification information for the receiver to specify the retransmission-requested packet; allowing the packet storage means to store the retransmission-requested packet based on the specification information; selecting a transmission-scheduled packet stored in the packet storage means based on a specified transmission rate and transmitting the selected packet provided with the number; storing the number provided to a packet transmitted by a process at the packet transmission step; and removing the transmission-scheduled packet not transmitted by a process at the packet transmission step from the packet storage means, wherein a process at the number provision step uses a number stored by a process at the number storage step to provide the number to an untransmitted packet stored in the packet storage means after removing a packet by a process at the removal step so that the provided number is consecutive to a number of a packet different from the most recently transmitted retransmission-requested packet.

A first program according to an embodiment includes the steps of: allowing the packet storage means to store the untransmitted packet and a retransmission-requested packet as transmission-scheduled packets; providing a number for identifying a transmission sequence of the packet to the untransmitted packet out of transmission-scheduled packets stored in the packet storage means; receiving specification information for the receiver to specify the retransmission-requested packet; allowing the packet storage means to store the retransmission-requested packet based on the specification information; selecting a transmission-scheduled packet stored in the packet storage means based on a specified transmission rate and transmitting the selected packet provided with the number; storing the number provided to a packet transmitted by a process at the packet transmission step; and removing the transmission-scheduled packet not transmitted by a process at the packet transmission step from the packet storage means, wherein a process at the number provision step uses a number stored by a process at the number storage step to provide the number to an untransmitted packet stored in the packet storage means after removing a packet by a process at the removal step so that the provided number is consecutive to a number of a packet different from the most recently transmitted retransmission-requested packet.

A receiver according to an embodiment: packet reception means for receiving a packet transmitted from the transmitter; detection means for using a number provided to a packet received by the packet reception means to detect a loss of the packet; and generation means for using a number assigned to a packet received by the packet reception means to generate loss information about a loss of the packet; and information transmission means for transmitting specification information to specify a packet with its loss detected by the detection means and loss information generated by the generation means to the transmitter.

A reception method according to an embodiment includes the steps of: receiving a packet transmitted from the transmitter; using a number provided to a packet received by a step at the packet reception step to detect a loss of the packet; and using a number assigned to a packet received by a step at the packet reception step to generate loss information about a loss of the packet; and transmitting specification information to specify a packet with its loss detected by a step at the detection step and loss information generated by a step at the generation step to the transmitter.

A second program according to an embodiment includes the steps of: receiving a packet transmitted from the transmitter; using a number provided to a packet received by a step at the packet reception step to detect a loss of the packet; and using a number assigned to a packet received by a step at the packet reception step to generate loss information about a loss of the packet; and transmitting specification information to specify a packet with its loss detected by a step at the detection step and loss information generated by a step at the generation step to the transmitter.

In the transmission and reception system according to an embodiment, the transmitter stores an untransmitted packet as a transmission-scheduled packet and provides the untransmitted packet with a number to identify the sequence of transmitting packets. The transmitter receives the specification information for specifying retransmission-requested packets from the receiver. Based on the specification information, the transmitter stores the retransmission-requested packet as a transmission-scheduled packet. The transmitter selects the transmission-scheduled packet based on a specified transmission rate. The transmitter transmits the selected packet with a number provided and stores the number provided to the packet to be transmitted. Based on the number, the transmitter numbers an untransmitted packet stored after removal of an untransmitted transmission-scheduled packet so as to be consecutive to the number of a packet different from the most recently transmitted retransmission-requested packet. The receiver receives packets transmitted from the transmitter. Based on the numbers assigned to the packets, the receiver detects a lost packet. The receiver transmits to the transmitter the specification information for specifying the lost packet.

The transmitter, the transmission method, and the program according to an embodiment store an untransmitted packet as a transmission-scheduled packet and provide the untransmitted packet with a number for identifying the sequence of transmitting the packet. The transmitter, the transmission method, and the program receive the specification information for specifying a retransmission-requested packet from the receiver and use the specification information to store the retransmission-requested packet as a transmission-scheduled packet. The transmitter, the transmission method, and the program select the transmission-scheduled packet based on a specified transmission rate. The transmitter, the transmission method, and the program assign a number to the selected packet to transmit it and store the number assigned to the transmitted packet. Based on the number, the transmitter, the transmission method, and the program number an untransmitted packet to be stored after removal of an untransmitted transmission-scheduled packet so as to be consecutive to the number of a packet different from the most recently transmitted retransmission-requested packet.

The receiver, the reception method, and the program according to an embodiment receive a packet transmitted from the transmitter. Based on the number assigned to the packet, the receiver, the reception method, and the program detect a loss of packet and generate loss information about the loss of packet. The receiver, the reception method, and the program transmit specification information for specifying a loss-detected packet and the loss information to the transmitter.

The invention can prevent congestion from occurring and transmission rates from degrading due to data retransmission.

Additional features and advantages are described herein, and will be apparent from, the following Detailed Description and the figures.

BRIEF DESCRIPTION OF THE FIGURES

FIG. 1 is a block diagram exemplifying the functional construction of a transmission system according to an embodiment;

FIG. 2 is a block diagram exemplifying the hardware construction of a transmitter in FIG. 1;

FIG. 5 shows a packet loss rate calculated by a rate control unit;

FIG. 9 is a flowchart showing a control information transmission process performed by the receiver;

FIG. 10 is a flowchart showing a control information reception process performed by the transmitter;

DETAILED DESCRIPTION

Figure 3A:
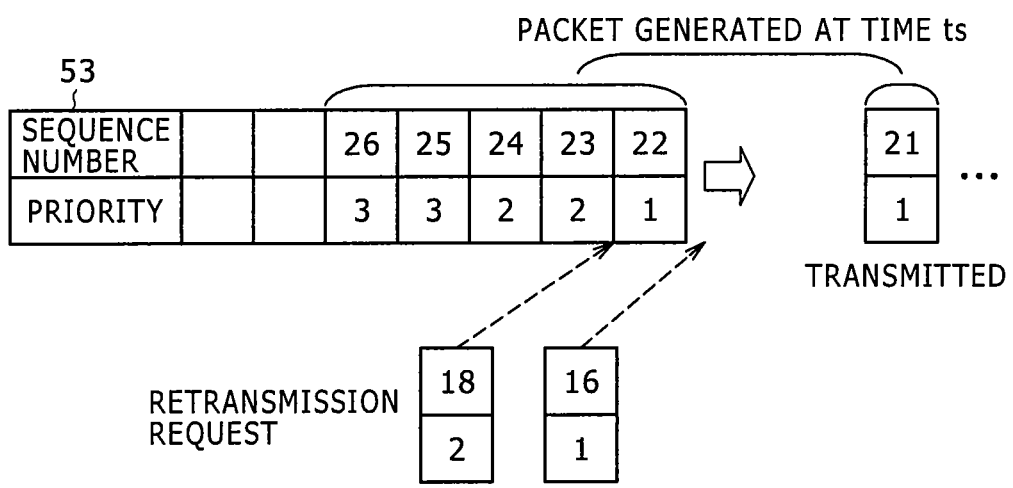
FIG. 3 shows an example how a retransmission control unit updates transmission packet buffer.

Prior to description of the embodiments of the invention, the following exemplifies the correspondence between constituent features in the application concerned and examples of the embodiments according to the invention.

Figure 6:
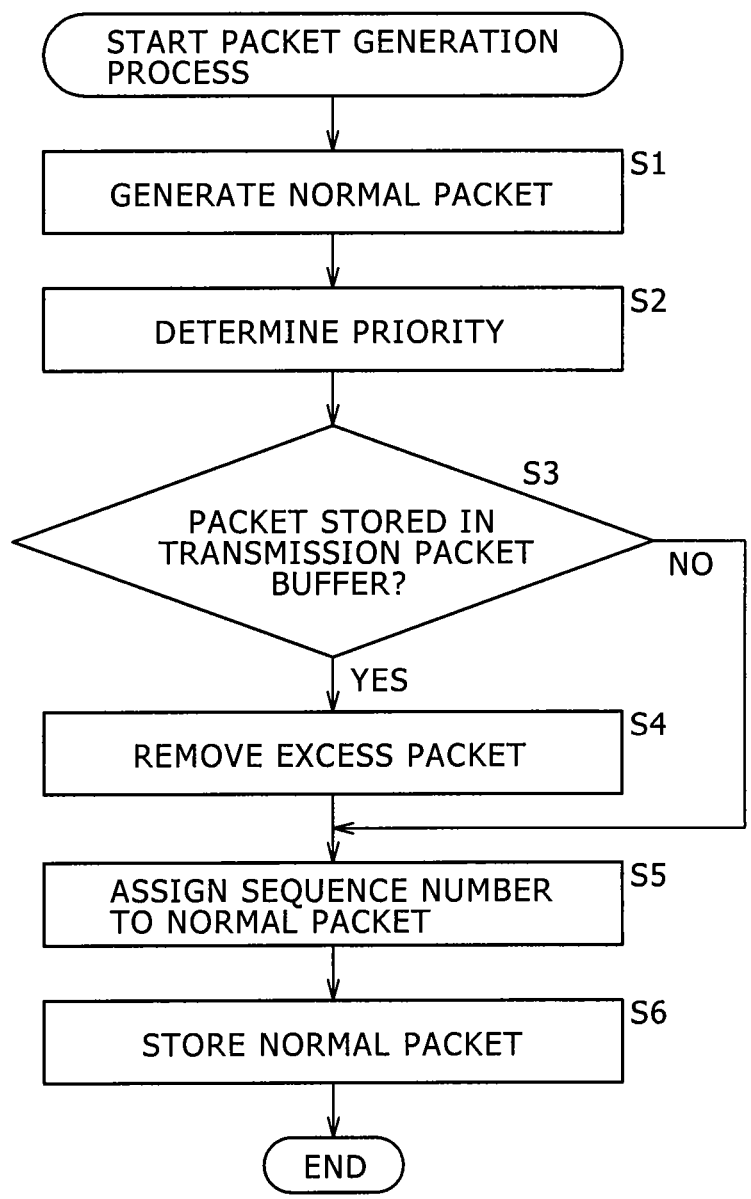
FIG. 6 is a flowchart showing a packet generation process in the transmitter.
Figure 7:
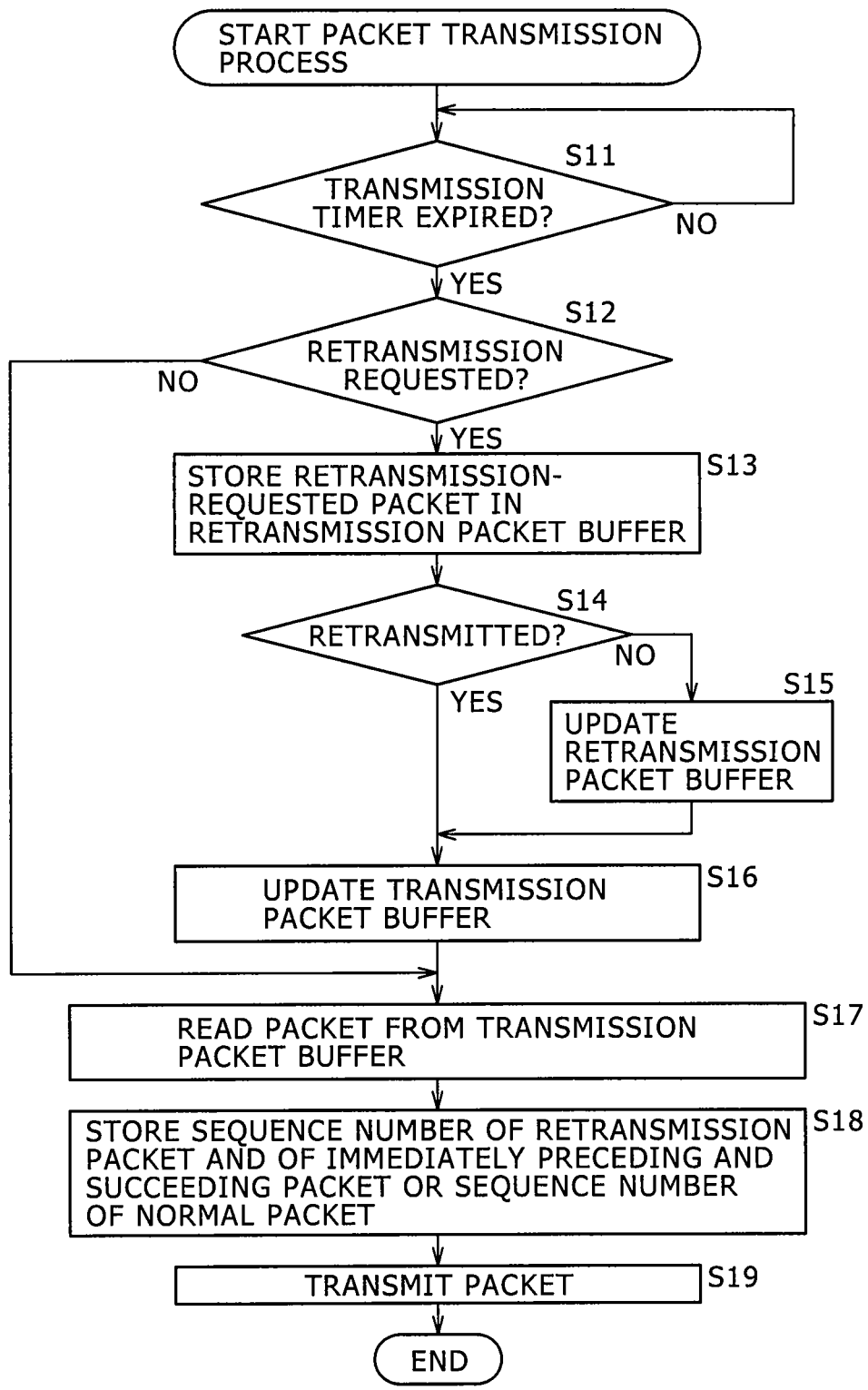
FIG. 7 is a flowchart showing a transmission generation process in the transmitter.

A transmission and reception system (e.g., a transmission system 11 in FIG. 1) according to an embodiment includes a transmitter (e.g., a transmission rate 11 in FIG. 1) to packetize and transmit intermittently generated data and a receiver (e.g., a receiver 13 in FIG. 1) to receive the packet, wherein the transmitter includes:

packet storage means (e.g., a transmission packet buffer 53 in FIG. 1) for storing an untransmitted packet and a retransmission-requested packet as transmission-scheduled packets;

number provision means (e.g., a sequence control unit 24 in FIG. 1) for providing a number for identifying a transmission sequence of the packet to the untransmitted packet out of transmission-scheduled packets stored in the packet storage means;

information reception means (e.g., a control information communication unit 27 in FIG. 1) for receiving specification information for the receiver to specify the retransmission-requested packet;

retransmission control means (e.g., a retransmission control unit 26 to perform a process at Step S16 in FIG. 7) for allowing the packet storage means to store the retransmission-requested packet based on the specification information;

packet transmission means (e.g., a transmission unit 30 in FIG. 1) for selecting a transmission-scheduled packet stored in the packet storage means based on a specified transmission rate and transmitting the selected packet provided with the number;

number storage means (e.g., a normal packet information storage unit 25 and a retransmission packet information storage unit 29 in FIG. 1) for storing the number provided to a packet transmitted by the packet transmission means; and removal means (e.g., a retransmission control unit 26 to perform a process at Step S4 in FIG. 6) for removing the transmission-scheduled packet not transmitted by the packet transmission means from the packet storage means;

wherein the number provision means uses a number stored in the number storage means to provide the number to an untransmitted packet stored in the packet storage means by the removal means after removing a packet so that the provided number is consecutive to a number of a packet different from the most recently transmitted retransmission-requested packet (e.g., a process at Step S5 in FIG. 6);

wherein the receiver includes:

packet reception means (e.g., a reception unit 71 in FIG. 1) for receiving a packet transmitted by the packet transmission means;

detection means (e.g., a sequence analysis unit 72 in FIG. 1) for using a number provided to a packet received by the packet reception means to detect a loss of the packet; and information transmission means (e.g., a control information communication unit 75 in FIG. 1) for transmitting to the transmitter the specification information designating a packet whose loss is detected by the detection means.

A transmitter (e.g., a transmitter 11 in FIG. 1) according to an embodiment packetizes intermittently generated data and transmits the same to a receiver, the transmitter including:

packet storage means (e.g., a transmission packet buffer 53 in FIG. 1) for storing an untransmitted packet and a retransmission-requested packet as transmission-scheduled packets;

number provision means (e.g., a sequence control unit 24 in FIG. 1) for providing a number for identifying a transmission sequence of the packet to the untransmitted packet out of transmission-scheduled packets stored in the packet storage means;

information reception means (e.g., a control information communication unit 27 in FIG. 1) for receiving specification information for the receiver to specify the retransmission-requested packet;

retransmission control means (e.g., a retransmission control unit 26 to perform a process at Step S16 in FIG. 7) for allowing the packet storage means to store the retransmission-requested packet based on the specification information;

packet transmission means (e.g., a transmission unit 30 in FIG. 1) for selecting a transmission-scheduled packet stored in the packet storage means based on a specified transmission rate and transmitting the selected packet provided with the number;

number storage means (e.g., a normal packet information storage unit 25 and a retransmission packet information storage unit 29 in FIG. 1) for storing the number provided to a packet transmitted by the packet transmission means; and removal means (e.g., a retransmission control unit 26 in FIG. 1 to perform a process at Step S4 in FIG. 6) for removing the transmission-scheduled packet not transmitted by the packet transmission means from the packet storage means, wherein the number provision means uses a number stored in the number storage means to provide the number to an untransmitted packet stored in the packet storage means after removing a packet by the removal means so that the provided number is consecutive to a number of a packet different from the most recently transmitted retransmission-requested packet (e.g., a process at Step S5 in FIG. 6).

The transmitter according to an embodiment further includes:

priority sequence provision means (e.g., a packet generation unit 22 in FIG. 1 to perform a process at Step S2 in FIG. 6) for providing a transmission priority sequence to the untransmitted packet, wherein the removal means preferentially removes the transmission-scheduled packet with a low priority sequence provided by the priority sequence provision means.

The transmitter according to an embodiment further includes:

determination means for determining a transmission rate (e.g., a retransmission control unit 28 in FIG. 1), wherein the information reception means also receives loss information about a loss of the packet from the receiver (e.g., a control information reception process in FIG. 10);

wherein the determination means determines the transmission rate based on loss information received by the information reception means (e.g., a process at Step S73 in FIG. 10); and wherein the packet transmission means selects the packet based on a transmission rate determined by the determination means (e.g., a process at Step S18 in FIG. 7).

There is provided the transmitter according to an embodiment, wherein the determination means determines the transmission rate based on the loss information and a number stored in the number storage means (e.g., a process at Step S73 in FIG. 10).

A transmission method according to an embodiment is provided for a transmitter (e.g., a transmitter 11 in FIG. 1) which packetizes intermittently generated data and transmits the same to a receiver and has packet storage means (e.g., a transmission packet buffer 53 in FIG. 1) for storing an untransmitted packet and a retransmission-requested packet as transmission-scheduled packets, the transmission method including the steps of:

allowing the packet storage means to store the untransmitted packet and a retransmission-requested packet as transmission-scheduled packets (e.g., Step S6 in FIG. 6);

providing a number for identifying a transmission sequence of the packet to the untransmitted packet out of transmission-scheduled packets stored in the packet storage means (e.g., Step S5 in FIG. 6);

receiving specification information for the receiver to specify the retransmission-requested packet (e.g., Step S12 in FIG. 7);

allowing the packet storage means to store the retransmission-requested packet based on the specification information (e.g., Step S16 in FIG. 7);

selecting a transmission-scheduled packet stored in the packet storage means based on a specified transmission rate and transmitting the selected packet provided with the number (e.g., Step S19 in FIG. 7);

storing the number provided to a packet transmitted by a process at the packet transmission step (e.g., Step S17 in FIG. 7); and removing the transmission-scheduled packet not transmitted by a process at the packet transmission step from the packet storage means (e.g., Step S4 in FIG. 6), wherein a process at the number provision step uses a number stored by a process at the number storage step to provide the number to an untransmitted packet stored in the packet storage means after removing a packet by a process at the removal step so that the provided number is consecutive to a number of a packet different from the most recently transmitted retransmission-requested packet (e.g., Step S5 in FIG. 6).

A program according to an embodiment is performed by a computer to control a transmitter (e.g., a transmission rate 11 in FIG. 1) which packetizes intermittently generated data and transmits the same to a receiver and has packet storage means for storing an untransmitted packet and a retransmission-requested packet as transmission-scheduled packets, the program including the steps of:

allowing the packet storage means to store the untransmitted packet and a retransmission-requested packet as transmission-scheduled packets (e.g., Step S6 in FIG. 6);

providing a number for identifying a transmission sequence of the packet to the untransmitted packet out of transmission-scheduled packets stored in the packet storage means (e.g., Step S5 in FIG. 6);

receiving specification information for the receiver to specify the retransmission-requested packet (e.g., Step S12 in FIG. 7);

allowing the packet storage means to store the retransmission-requested packet based on the specification information (e.g., Step S16 in FIG. 7);

selecting a transmission-scheduled packet stored in the packet storage means based on a specified transmission rate and transmitting the selected packet provided with the number (e.g., Step S19 in FIG. 7);

storing the number provided to a packet transmitted by a process at the packet transmission step (e.g., Step S17 in FIG. 7); and removing the transmission-scheduled packet not transmitted by a process at the packet transmission step from the packet storage means (e.g., Step S4 in FIG. 6), wherein a process at the number provision step uses a number stored by a process at the number storage step to provide the number to an untransmitted packet stored in the packet storage means after removing a packet by a process at the removal step so that the provided number is consecutive to a number of a packet different from the most recently transmitted retransmission-requested packet (e.g., Step S5 in FIG. 6).

A receiver (e.g., a receiver 13 in FIG. 1) according to an embodiment receives packets from a transmitter (e.g., a transmitter 11 in FIG. 1) and includes:

packet reception means for receiving a packet transmitted from the transmitter (e.g., a reception unit 71 in FIG. 1);

detection means for using a number provided to a packet received by the packet reception means to detect a loss of the packet (e.g., a sequence analysis unit 72 in FIG. 1); and generation means for using a number assigned to a packet received by the packet reception means to generate loss information about a loss of the packet (e.g., a communication state information generation unit 74 in FIG. 1); and information transmission means (e.g., a control information communication unit 75 in FIG. 1) for transmitting specification information to specify a packet with its loss detected by the detection means and loss information generated by the generation means to the transmitter.

Figure 8:
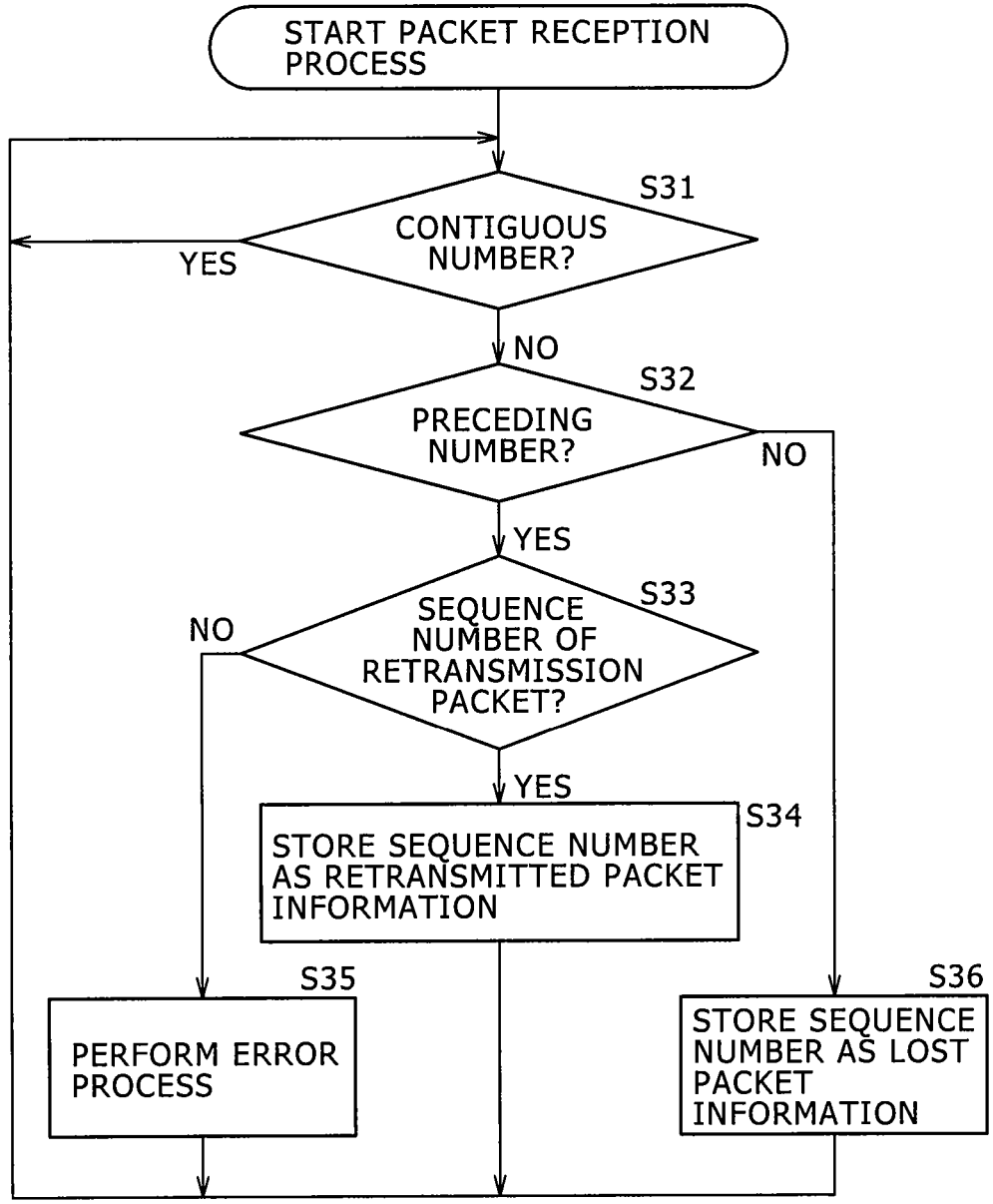
FIG. 8 is a flowchart showing a packet reception process performed by a receiver in FIG. 1.

A reception method according to an embodiment is provided for a receiver (e.g., a receiver 13 in FIG. 1) to receive packets from a transmitter (e.g., a transmitter 11 in FIG. 1), the reception method including the steps of:

receiving a packet transmitted from the transmitter (e.g., Step S31 in FIG. 8);

using a number provided to a packet received by a step at the packet reception step to detect a loss of the packet (e.g., Step S36 in FIG. 8); and using a number assigned to a packet received by a step at the packet reception step to generate loss information about a loss of the packet (e.g., Step S52 in FIG. 9); and transmitting specification information to specify a packet with its loss detected by a step at the detection step and loss information generated by a step at the generation step to the transmitter (e.g., Step S53 in FIG. 9).

A program according to an embodiment allows a computer to perform a reception process to receive packets from a transmitter (e.g., a transmitter 11 in FIG. 1), the program including the steps of:

receiving a packet transmitted from the transmitter (e.g., Step S31 in FIG. 8);

using a number provided to a packet received by a step at the packet reception step to detect a loss of the packet (e.g., Step S36 in FIG. 8); and using a number assigned to a packet received by a step at the packet reception step to generate loss information about a loss of the packet (e.g., Step S52 in FIG. 9); and transmitting specification information to specify a packet with its loss detected by a step at the detection step and loss information generated by a step at the generation step to the transmitter (e.g., Step S53 in FIG. 9).

Embodiments of the invention will be described in further detail with reference to the accompanying drawings.

FIG. 1 is a block diagram exemplifying the functional construction of a transmission system 1 according to an embodiment of the invention.

The transmission system 1 in FIG. 1 is composed of a transmitter 11, a network 12, and a receiver 13.

The transmitter 11 is composed of a packet generation unit 22, a transmission buffer 23, a sequence control unit 24, a normal packet information storage unit 25, a retransmission control unit 26, a control information communication unit 27, a rate control unit 28, a retransmission packet information storage unit 29, and a transmission unit 30.

The packet generation unit 22 of the transmitter 11 is composed of a video device or a digital still camera, for example, and intermittently generates data such as multimedia data and image data in units of reproduction frames. The packet generation unit 22 stores the generated data as a file. The packet generation unit 22 uses a coding rate from the rate control unit 28 to code and packetize the data. The packet generation unit 22 provides a data packet with a transmission priority (priority sequence) and supplies the packet and the priority to the transmission buffer 23.

The transmission buffer 23 is composed of a normal packet buffer 51, a retransmission packet buffer 52, and a transmission packet buffer 53. The normal packet buffer 51 is supplied with a packet from the packet generation unit 22. The normal packet buffer 51 stores the packet as a normal packet in units of time used to generate the normal packet. The retransmission packet buffer 52 stores normal packets that are stored in the normal packet buffer 51 and are requested for retransmission (targeted for retransmission request) by the receiver 13. The retransmission packet buffer 52 stores the normal packets as retransmission packets. The transmission packet buffer 53 stores normal packets to be transmitted and retransmission packets.

The normal packet buffer 51, the retransmission packet buffer 52, and the transmission packet buffer 53 store sequence numbers and priorities corresponding to packets. As will be described later, the sequence control unit 24 supplies sequence numbers for identifying transmission sequences.

The sequence control unit 24 provides normal packets stored in the normal packet buffer 51 with sequence numbers so as to be successive in the order of transmission. The sequence control unit 24 stores the sequence numbers and the priorities supplied by the packet generation unit 22 correspondingly to normal packets stored in the normal packet buffer 51.

The transmission unit 30 supplies sequence numbers of transmitted normal packets. The sequence control unit 24 supplies these sequence numbers as normal packet information to the normal packet information storage unit 25. The normal packet information storage unit 25 stores the normal packet information from the sequence control unit 24.

The control information communication unit 27 supplies specification information for specifying normal packets.

Based on this specification information, the retransmission control unit 26 reads a normal packet requested for retransmission from the normal packet buffer 51 of the transmission buffer 23. The retransmission control unit 26 stores that normal packet as a retransmission packet in the retransmission packet buffer 52. Further, the retransmission control unit 26 reads the sequence number and the priority associated with the normal packet (retransmission packet). The retransmission control unit 26 allows the retransmission packet buffer 52 to store the sequence number and the priority in association with the retransmission packet.

The retransmission control unit 26 determines whether or not to retransmit a retransmission packet stored in the retransmission packet buffer 52. The retransmission control unit 26 performs this determination based on whether or not the transmission unit 30 can transmit the retransmission packet so as to arrive by the time when the receiver 13 reproduces that retransmission packet. The retransmission control unit 26 updates the transmission packet buffer 53 by allowing it to store the following based on the priorities, for example, in the order of transmission: retransmission packets determined to be retransmitted, i.e., retransmission packets targeted for retransmission, or untransmitted normal packets stored in the normal packet buffer 51, and the sequence numbers and the priorities associated with the retransmission packets or the normal packets.

The retransmission control unit 26 supplies the retransmission control unit 28 with retransmission packet information including: sequence numbers that are supplied from the transmission unit 30 and are assigned to the transmitted retransmission packets; and sequence numbers assigned to packets before and after the retransmission packets.

The control information communication unit 27 receives the following as control information from the receiver 13 (the control information communication unit 75 thereof): specification information and communication state information indicating communication states of the network 12. The control information communication unit 27 supplies the retransmission control unit 26 with the specification information and supplies the rate control unit 28 with the specification information and the communication state information.

The rate control unit 28 supplies the packet information storage unit 29 with retransmission packet information from the retransmission control unit 26 and allows the packet information storage unit 29 to store the information. The rate control unit 28 reads the retransmission packet information already stored in the retransmission packet information storage unit 29.

The retransmission control unit 28 uses the retransmission packet information read from the retransmission packet information storage unit 29 and the communication state information from the control information communication unit 27 to determine a transmission rate (sending rate) and supplies the rate to the transmission unit 30. Further, the retransmission control unit 28 uses the transmission rate to determine a coding rate for data and supplies the coding rate to the packet generation unit 22.

The transmission unit 30 sequentially reads packets stored in the transmission packet buffer 53 of the transmission buffer 23 and sequence numbers associated with the packets at a time interval (timing) in accordance with the transmission rate from the retransmission control unit 28. The transmission unit 30 provides sequence numbers to the packets and transmit them. The transmission unit 30 supplies the sequence control unit 24 with the sequence numbers of the transmitted normal packets. In addition, the transmission unit 30 supplies the retransmission control unit 26 with the sequence numbers of the transmitted retransmission packets and the sequence numbers of the packets before and after the retransmission packets.

The network 12 represents the Internet, for example. The network 12 allows communication between the transmitter 11 and the receiver 13 with each other in accordance with a specified protocol such as TCP/IP (Transmission Control Protocol/Internet Protocol). The network 12 may be wired or wireless.

The receiver 13 is composed of a reception unit 71, a sequence analysis unit 72, a storage unit 73, a communication state information generation unit 74, a control information communication unit 75, a reception buffer 76, and an output unit 78.

The reception unit 71 receives packets transmitted from the transmission unit 30 of the transmitter 11 and supplies the packets to the sequence analysis unit 72, the communication state information generation unit 74, and the reception buffer 76.

The sequence analysis unit 72 analyzes a sequence number attached to the packet from the reception unit 71 to detect a loss of normal packets. The sequence analysis unit 72 supplies the storage unit 73 with retransmitted packet information, lost packet information, and transmitted packet information to store them. The retransmitted packet information indicates sequence numbers of the received retransmission packets. The lost packet information indicates sequence numbers of the lost normal packets. The transmitted packet information indicates sequence numbers of the received normal packets.

The sequence analysis unit 72 reads the lost packet information stored in the storage unit 73 and supplies the control information communication unit 75 with that information as the specification information to specify packets requested for retransmission. The sequence analysis unit 72 supplies the communication state information generation unit 74 with the retransmitted packet information and the transmitted packet information stored in the storage unit 73. Further, the sequence analysis unit 72 removes packets from the reception buffer 76 as an error process based on sequence numbers attached to the packets from the reception unit 71.

The storage unit 73 stores the retransmitted packet information, the lost packet information, and the transmitted packet information from the sequence analysis unit 72.

Based on packets from the reception unit 71, the communication state information generation unit 74 generates, for example, the time to receive the packet, the time to transmit the communication state information, and the like as RTT information needed for the transmitter 11 to calculate the RTT. The communication state information generation unit 74 generates retransmitted packet information and transmitted packet information from the sequence analysis unit 72 as loss rate information about losses. This information is needed for the transmitter 11 to calculate a packet loss rate. The communication state information generation unit 74 supplies the control information communication unit 75 with the RTT information and the loss rate information as the communication state information.

The control information communication unit 75 packetizes the specification information from the sequence analysis unit 72 and the communication state information from the communication state information generation unit 74 as control information. The control information communication unit 75 transmits the control information to the control information communication unit 27 of the transmitter 11 via the network 12.

The reception buffer 76 stores packets from the reception unit 71. The output unit 78 reads and decodes packets from the reception buffer 76 at a specified timing. The output unit 78 displays images or generates sounds corresponding to the decoded data.

FIG. 2 is a block diagram exemplifying the hardware construction of the transmitter 11 in FIG. 1.

As shown in FIG. 2, a CPU (Central Processing Unit) 101 is connected to ROM (Read Only Memory) 102 and RAM (Random Access Memory) 103 via a bus 104. The CPU 101, the ROM 102, and the RAM 103 are constructed as a microcomputer, for example. The CPU 101 performs various processes in accordance with a program stored in the ROM 102 or a program recorded in a recording unit 108. The RAM 103 stores programs and data used for the CPU 101.

The CPU 101 connects with an input/output interface 105 via the bus 104. The input/output interface 105 connects with an input unit 106 composed of a keyboard and a mouse and connects with an output unit 107 composed of an LCD (Liquid Crystal Display) and a CRT (Cathode Ray Tube) display. The CPU 101 performs various processes in accordance with instructions supplied from the input unit 106. The CPU 101 outputs images and sounds resulting from the processes to the output unit 107.

The recording unit 108 is connected to the input/output interface 105 and is composed of a hard disk, for example, to record programs and various data used for the CPU 101. A communication unit 109 communicates with the receiver 13 via the network 12, for example.

Programs may be acquired via the communication unit 109 and may be recorded in the recording unit 108.

A drive 110 connected to the input/output interface 105 may be mounted with a removable medium 111 such as a magnetic disk, an optical disk, a magnetic optical disk, and semiconductor memory. The drive 110 drives the removable medium 111, when mounted, and acquires programs and data recorded thereon. The acquired programs and data are transferred to and recorded on the recording unit 108 as needed.

The receiver 13 is constructed similarly to the transmitter 11 and a description is omitted for simplicity.

Referring now to FIGS. 3A and 3B and 4A and 4B, the following exemplifies how the retransmission control unit 26 updates the transmission packet buffer 53.

Figure 3B:
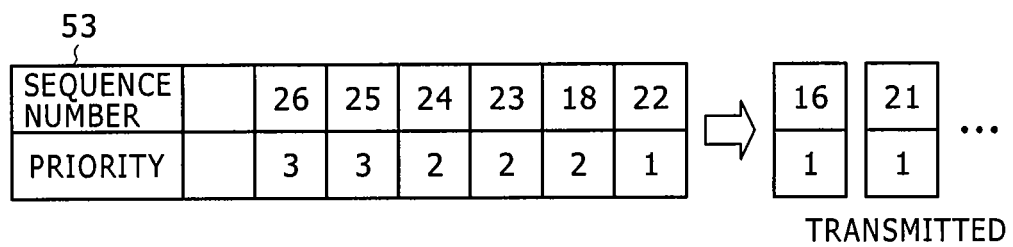

In FIGS. 3A and 3B, the packet generation unit 22 in FIG. 1 supplies the transmission packet buffer 53 with six normal packets (hereafter referred to as time-ts normal packets) generated at time ts (a variable for convenience of description). It is assumed that value 20 is assigned as the maximum sequence number (the sequence number of the most recently transmitted normal packet) for normal packets already transmitted by the transmission unit 30.

In FIG. 3A, the packet generation unit 22 determines transmission priorities of time-ts normal packets in accordance with a sequence of packets (packet sequence) supplied from the packet generation unit 22 so that low priorities are assigned to normal packets backward (to the left of the transmission packet buffer 53 in FIG. 3A). It is assumed that a smaller priority number signifies a higher priority.

The sequence control unit 24 provides sequence numbers 21 through 26 to time-ts normal packets supplied from the packet generation unit 22 according to the packet sequence so as to be consecutive to the maximum sequence number 20 for the transmitted normal packets. The normal packet buffer 51 and the transmission packet buffer 53 of the transmission buffer 23 store time-ts normal packets supplied from the packet generation unit 22 as well as the corresponding sequence numbers and priorities.

It is assumed that, though not shown in FIG. 3A, normal packets are stored correspondingly to the sequence numbers and priorities. In FIG. 3A, the right end of the transmission packet buffer 53 indicates the beginning. These considerations are also applicable to FIG. 3B, FIGS. 4A and 4B, FIGS. 11A and 11B, and FIGS. 12A and 12B.

As shown in FIG. 3A, the transmission unit 30 transmits the normal packet with sequence number 21 stored at the beginning of the transmission packet buffer 53 at a timing corresponding to the transmission rate. After that, the receiver 13 supplies control information, i.e., the specification information that specifies normal packets with sequence numbers 16 and 18 as packets requested for retransmission. The specification information is supplied via the network 12 and the control information communication unit 27. In this case, the retransmission control unit 26 reads priorities and normal packets that correspond to sequence numbers 16 and 18 and are stored in the normal packet buffer 51. The retransmission control unit 26 then supplies the priorities and the normal packets to the retransmission packet buffer 52. The normal packet with sequence number 21 has been transmitted and is removed from the transmission packet buffer 53 where the packet was stored.

The retransmission control unit 26 updates the transmission packet buffer 53 based on priorities of time-ts normal packets other than the transmitted normal packet with sequence number 21 and based on priorities of retransmission packets. The normal packet buffer 51 stores the time-ts normal packets. The retransmission packet buffer 52 stores the retransmission packets.

Specifically, as shown in FIG. 3B, the retransmission packet with sequence number 16 has priority 1. The retransmission control unit 26 allows the transmission packet buffer 53 to store the retransmission packet with sequence number 16 in preference to the time-ts normal packet with sequence number 22 that is the smallest sequence number in those assigned to time-ts normal packets other than the normal packet with sequence number 21 and priority 1.

The retransmission packet with sequence number 18 has priority 2. Therefore, the retransmission control unit 26 allows the transmission packet buffer 53 to store the time-ts normal packet with priority 1 and sequence number 22 in succession to the retransmission packet with sequence number 16. After that, the retransmission control unit 26 allows the transmission packet buffer 53 to sequentially store the retransmission packet with sequence number 18 and the time-ts normal packets with sequence numbers 23 through 26.

The transmission unit 30 reads the packet with sequence number 16 stored at the beginning of the transmission packet buffer 53 at a time interval (timing) in accordance with the transmission rate from the retransmission control unit 28. The transmission unit 30 transmits that packet to the receiver 13 via the network 12.

In FIGS. 3A and 3B, it is assumed that retransmission packets are transmitted in preference to time-ts normal packets when the same priority is assigned. Further, it may be preferable to transmit time-ts normal packets in preference to retransmission packets.

The transmission unit 30 transmits the retransmission packet with sequence number 16 and then transmits the packets with sequence numbers 22, 18, 23, and 24 stored in the transmission packet buffer 53. At time ts+1, the packet generation unit 22 generates six normal packets (hereafter referred to as time ts+1 normal packets) provided with priorities. The packet generation unit 22 supplies the ts+1 normal packets to the transmission packet buffer 53.

Figure 4A:
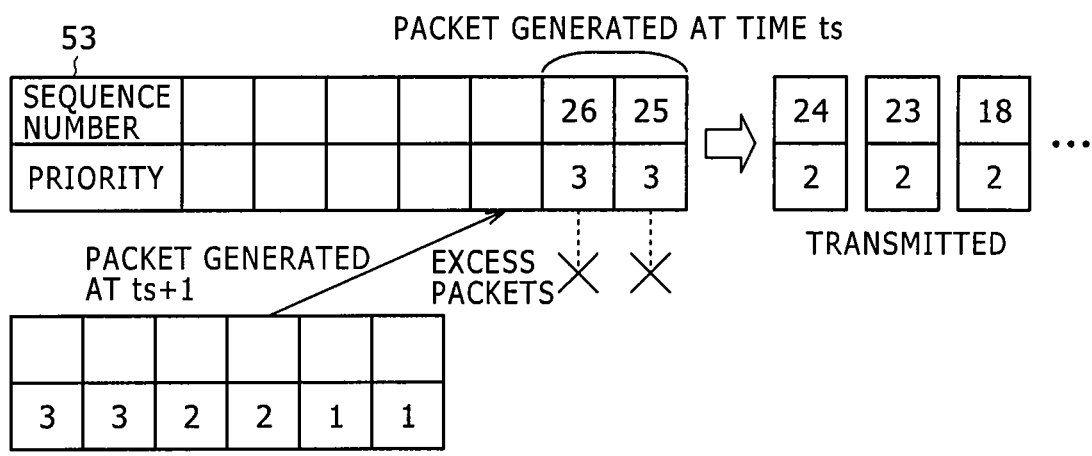
FIG. 4 shows another example how the retransmission control unit updates the transmission packet buffer.

As shown in FIG. 4A, the retransmission control unit 26 removes two untransmitted time-ts normal packets from the transmission packet buffer 53 as excesses not transmitted by the time ts+1 when the time ts+1 normal packet is generated. That is, the retransmission control unit 26 removes the time-ts normal packets with sequence numbers 25 and 26 that are not transmitted by the time ts+1. The retransmission control unit 26 also removes the time-ts normal packets with sequence numbers 25 and 26 from the normal packet buffer 51.

Figure 4B:
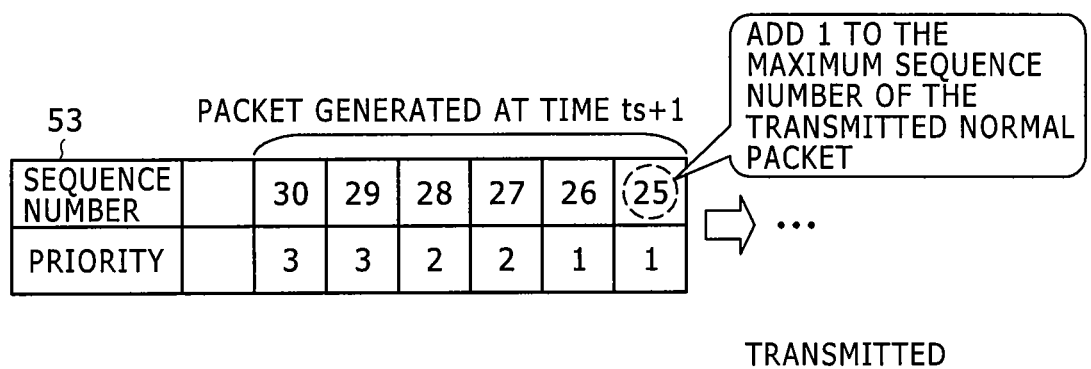

As shown in FIG. 4B, the sequence control unit 24 assigns sequence numbers from 25 to time ts+1 normal packets according to the packet sequence. Value 25 results from adding 1 to the maximum sequence number 24 for the transmitted normal packets. That is, sequence numbers 25 through 30 are assigned to the time ts+1 normal packets stored in the normal packet buffer 51. The normal packet buffer 51 and the transmission packet buffer 53 store the time ts+1 normal packets from the packet generation unit 22 as well as the corresponding priorities and sequence numbers.

In the transmission system 1 in FIG. 1 as mentioned above, the sequence control unit 24 provides time ts+1 normal packets from the value next to the maximum sequence number for the transmitted normal packets. The transmission unit 30 can transmit the normal packets with successive sequence numbers.

The receiver 13 can accurately detect a loss based on sequence numbers assigned to the received packets. As a result, it is possible to prevent degradation of the transmission rate calculated by using a packet loss rate and provide the stable throughput.

There may be a case where the receiver 13 does not request retransmission of a normal packet, i.e., the receiver 13 does not supply the specification information. In this case, the transmission unit 30 reads the time ts+1 normal packet with sequence number 25 stored at the beginning of the transmission packet buffer 53. The transmission unit 30 transmits the time ts+1 normal packet to the receiver 13 via the network 12.

Figure 5:
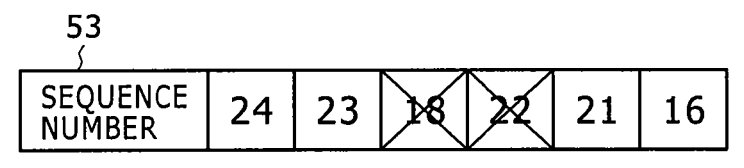

Referring now to FIG. 5, the following describes the packet loss rate calculated by the retransmission control unit 28 of the transmitter 11.

As shown in FIGS. 3A, 3B, and 4A, the transmitter 11 sequentially transmits six packets with sequence numbers 16, 21, 22, 18, 23, and 24. As shown in FIG. 5, the packets with sequence numbers 22 and 18 are lost. In this case, the sequence analysis unit 72 of the receiver 13 uses packet sequence numbers supplied from the reception unit 71 and allows the storage unit 73 to store sequence number 16 as the retransmitted packet information indicative of sequence numbers for the received retransmission packets. In addition, the sequence analysis unit 72 supplies that sequence number to the communication state information generation unit 74.

The sequence analysis unit 72 detects that the sequence number of a packet supplied from the reception unit 71 is not consecutive to the previous sequence number 21 and that the packet with sequence number 22 is lost based on the packet with sequence number 23 different from the previous sequence number. The sequence analysis unit 72 allows the storage unit 73 to store sequence number 22 as the lost packet information indicating the sequence number of the lost normal packet. The sequence analysis unit 72 then supplies the control information communication unit 75 with sequence number 22 indicated by the lost packet information as the specification information for specifying the packet requested for retransmission.

The sequence analysis unit 72 further uses sequence numbers of packets supplied from the reception unit 71 and allows the storage unit 73 to store sequence numbers 21, 23, and 24 as the transmitted packet information indicating sequence numbers of the received normal packets. In addition, the sequence analysis unit 72 supplies that information to the communication state information generation unit 74.

As a result, the control information communication unit 75 of the receiver 13 transmits the communication state information and the specification information as control information to the transmitter 11. The communication state information includes the loss rate information composed of the retransmitted packet information indicating sequence number 16 and the transmitted packet information indicating sequence numbers 21, 23, and 24. The specification information indicates sequence number 22.

The transmission unit 30 has already transmitted the retransmission packets with sequence numbers 16 and 18. Accordingly, the retransmission packet information stored in the retransmission packet information storage unit 29 indicates sequence number 16 of the retransmission packet, sequence number 21 after the retransmission packet, sequence number 18 of the retransmission packet, and sequence numbers 22 and 23 before and after the retransmission packet.

The retransmission control unit 28 uses the specification information from the receiver 13 to recognize that there is one lost packet with sequence number 22. The retransmission control unit 28 uses the transmitted packet information, the specification information, and the retransmission packet from the receiver 13 to recognize two retransmission packets to be retransmitted. That is, one is the retransmission packet with sequence number 16 before the normal packet with sequence number 21. The other is the retransmission packet with sequence number 18 between the normal packets with sequence numbers 22 and 23.

However, the retransmission packet information from the receiver 13 represents only sequence number 16. Accordingly, the retransmission control unit 28 recognizes that the retransmission packet with sequence number 18 is lost. As a result, the retransmission control unit 28 recognizes that six packets are to be transmitted, i.e., the normal packets with sequence numbers 21, 23, and 24 indicated by the normal packet information, the retransmission packet with sequence number 16 indicated by the retransmitted packet information, the normal packet with sequence number 22 indicated by the lost packet information, and the packet with sequence number 18, namely the lost retransmission packet. The rate control unit 28 also recognizes that two packets are lost, i.e., the normal packet with sequence number 23 and the retransmission packet with sequence number 18. Consequently, the retransmission control unit 28 calculates $2/6(=1/3)$ to be a packet loss rate.

Referring now to FIG. 6, the following describes a packet generation process in the transmitter 11. For example, the packet generation process starts at the timing of generating a data packet equivalent to one frame based on a frame rate of data generated by the packet generation unit 22.

At Step S1, the packet generation unit 22 uses the coding rate supplied from the rate control unit 28, codes and packetizes data in units of frames, generates a normal packet, and proceeds to Step S2.

At Step S2, the packet generation unit 22 determines the priority of the normal packet generated at Step S1. The packet generation unit 22 supplies the packet and the priority to the transmission buffer 23 and proceeds to Step S3.

At Step S3, the retransmission control unit 26 determines whether or not the transmission packet buffer 53 stores a packet. When a packet is stored, the process proceeds to Step S4.

At Step S4, the retransmission control unit 26 removes an excess packet stored in the transmission packet buffer 53.

In this manner, the retransmission control unit 26 removes an excess packet. The transmission unit 30 can transmit a retransmission packet without causing an excess in the transmission rate from the retransmission control unit 28. As a result, the transmission system 1 can stabilize the communication state of the network 12 without causing congestion.

At Step S3, it may be determined that the transmission packet buffer 53 stores no packet, i.e., there is no excess packet. The process skips Step S4 and proceeds to Step S5.

At Step S5, the sequence control unit 24 sequentially provides sequence numbers to the normal packets generated at Step S1. The sequence numbers begin from a value resulting from adding 1 to the maximum sequence number for normal packets stored in the normal packet information storage unit 25 at Step S18 in FIG. 7 to be described later. In the first process at Step S5, the sequence control unit 24 provides sequence numbers from a specified initial value according to the packet sequence.

After Step S5, the process proceeds to Step S6. The packet generation unit 22 allows the normal packet buffer 51 and the transmission packet buffer 53 to store the normal packet generated at Step S1 as well as the corresponding priority and sequence number, and then terminates the process.

Referring now to FIG. 7, the following describes a packet transmission process in the transmitter 11.

At Step S11, the transmission unit 30 uses the transmission rate supplied from the retransmission control unit 28 to determine whether or not a transmission timer (not shown) expires, i.e., the current instant is the time to transmit the packet. The transmission timer counts the time from the previous transmission to the next transmission. When it is determined that the transmission timer does not expire, the transmission unit 30 waits until the transmission timer expires.

When it is determined at Step S11 that the transmission timer expires, the process proceeds to Step S12. The retransmission control unit 26 determines whether or not the receiver 13 issues a retransmission request. More specifically, the retransmission control unit 26 determines whether or not the control information communication unit 75 of the receiver 13 supplies the specification information, i.e., the information to specify a packet requested for retransmission, via the network 12 and the control information communication unit 27. When it is determined that the receiver 13 issues the retransmission request, the process proceeds to Step S13.

At Step S13, the retransmission control unit 26 uses the specification information to read from the normal packet buffer 51 the packet that is specified in the specification information and is requested for retransmission. The retransmission control unit 26 allows the retransmission packet buffer 52 to store that packet as a retransmission packet, and then proceeds to Step S14.

At Step S14, the retransmission control unit 26 uses the retransmission packet stored in the retransmission packet buffer 52 at Step S13 to determine whether or not to retransmit at least one retransmission packet. For example, the retransmission control unit 26 determines whether or not the transmission unit 30 can transmit the retransmission packet so as to arrive by the time when the receiver 13 reproduces that retransmission packet. When the result is affirmative, the retransmission control unit 26 determines to retransmit the retransmission packet. When the result is negative, the retransmission control unit 26 determines not to retransmit the retransmission packet.

When it is determined at Step S14 that at least one retransmission packet will not be retransmitted, the process proceeds to Step S15. The retransmission control unit 26 removes the retransmission packet stored in the retransmission packet buffer 53 to update the retransmission packet buffer 52. The process proceeds to Step S16.

When it is determined at Step S14 that at least one retransmission packet will be retransmitted, the process proceeds to Step S16. When there is a retransmission packet determined not to be retransmitted at Step S14, the retransmission control unit 26 removes that retransmission packet from the retransmission packet buffer 52.

At Step S16, the retransmission control unit 26 updates the transmission packet buffer 53 based on the priority corresponding to the normal packet currently stored in the transmission packet buffer 51 and the priority corresponding to the retransmission packet stored in the retransmission packet buffer 52. That is, the retransmission control unit 26 allows the transmission packet buffer 53 to store normal packets and retransmission packets in the order of transmission.

When it is determined at Step S12 that no retransmission request is issued, or after the process at Step S16 is completed, the process proceeds to Step S17. The transmission unit 30 reads the packet stored at the beginning of the transmission packet buffer 53. When the packet is a normal packet, the transmission unit 30 supplies the sequence control unit 24 with the normal packet's sequence number. When the packet is a retransmission packet, the transmission unit 30 supplies the retransmission control unit 26 with the retransmission packet's sequence number and the sequence numbers before and after the retransmission packet. The packet read from the transmission packet buffer 53 is removed from the transmission packet buffer 53.

After Step S17, the process proceeds to Step S18. The retransmission control unit 26 allows the retransmission packet information storage unit 29 to store the retransmission packet information via the rate control unit 28. The retransmission packet information includes the sequence number of the retransmission packet supplied at Step S17 and the sequence numbers of the packets before and after the retransmission packet. Alternatively, the sequence control unit 24 supplies the normal packet information storage unit 25 with the sequence number of the normal packet supplied at Step S17 as the normal packet information to store this information.

After Step S18, the process proceeds to Step S19. The transmission unit 30 transmits the packet read at Step S17 to the receiver 13 via the network 12 to terminate the process. The process then terminates.

In the above-mentioned packet generation process, the retransmission control unit 26 removes an excess packet. When a single priority is used and the coding rate can be fine-tuned, the retransmission control unit 26 may not remove an excess packet. In this case, the rate control unit 28 specifies a coding rate smaller than the transmission rate. The process at Step S19 in FIG. 7 transmits an excess packet stored in the transmission packet buffer 53.

In FIGS. 4A and 4B, for example, let us consider that the packet generation unit 22 encodes data into four packets as time ts+1 normal packets resulting from removing two excess time-ts normal packets. In this case, it is also possible to transmit the excess time-ts normal packets with sequence numbers 25 and 26 by the time ts+2 when the next normal packet is to be generated. Accordingly, the retransmission control unit 26 does not remove excess packets. The sequence control unit 24 sequentially provides sequence numbers from 27 to the time ts+1 normal packets. The transmission unit 30 transmits not only the time ts+1 normal packets, but also excess time-ts normal packets.

Referring now to FIG. 8, the following describes a packet reception process performed by the receiver 13 in FIG. 1. The packet reception process starts, for example, when the reception unit 71 receives a packet transmitted from the transmission unit 30 of the transmitter 12. The reception unit 71 supplies received packets to the sequence analysis unit 72, the communication state information generation unit 74, and the reception buffer 76.

At Step S31, the sequence analysis unit 72 determines whether or not the sequence number assigned to the packet supplied from the reception unit 71 is consecutive to the previously assigned sequence number. When the sequence number is determined to be consecutive, the sequence analysis unit 72 allows the storage unit 73 to store the received packet's sequence number as the transmitted packet information. The process is repeated until there is supplied a packet with an unconsecutive sequence number.

When it is determined at Step S31 that the sequence number assigned to a packet supplied from the reception unit 71 is not consecutive to the previously assigned sequence number, the process proceeds to Step S32. The sequence analysis unit 72 determines whether or not the sequence number assigned to the packet supplied from the reception unit 71 precedes the previously assigned sequence number.

When it is determined at Step S32 that the sequence number assigned to the packet supplied from the reception unit 71 precedes the previously assigned sequence number, the process proceeds to Step S33. The sequence analysis unit 72 determines whether or not the sequence number is assigned to the retransmission packet. That is, the sequence analysis unit 72 determines whether or not the sequence number is assigned as the lost packet information to a lost normal packet stored in the storage unit 73 at Step S36 to be described later.

When it is determined at Step S33 that the sequence number assigned to the packet supplied from the reception unit 71 corresponds to the sequence number assigned to the retransmission packet, the process proceeds to Step S34. The sequence analysis unit 72 allows the storage unit 73 to store the sequence number as the retransmitted packet information indicating the sequence number of the received retransmission packet. The process returns to Step S31.

When it is determined at Step S33 that the sequence number assigned to the packet supplied from the reception unit 71 is not the retransmission packet's sequence number, the process proceeds to Step S35. The sequence analysis unit 72 performs an error process such as removing the packet corresponding to the sequence number from the reception buffer 76, for example. The process then returns to Step S31.

When it is determined at Step S32 that the sequence number assigned to the packet supplied from the reception unit 71 does not precede the previously assigned sequence number, the process proceeds to Step S36. The sequence analysis unit 72 allows the storage unit 73 to store the sequence number between the previously supplied sequence number and the sequence number assigned to the packet currently supplied from the reception unit 71. The storage unit 73 stores that sequence number as the lost packet information indicating the sequence number of the lost normal packet.

That is, the sequence analysis unit 72 detects a packet loss based on the previously supplied sequence number and the sequence number assigned to the packet currently supplied from the reception unit 71. The sequence analysis unit 72 allows the with a thickness of 73 to store the sequence number assigned to the packet currently supplied from the reception unit 71 as the transmitted packet information. The process then returns to Step S31.

Referring now to FIG. 9, the following describes a control information transmission process performed by the receiver 13.

At Step S51, the sequence analysis unit 72 reads, from the storage unit 73, the retransmitted packet information stored at Step S34 in FIG. 8 and the lost packet information and the transmitted packet information stored at Step S36 in FIG. 8. The sequence analysis unit 72 supplies the retransmitted packet information and the transmitted packet information to the communication state information generation unit 74. The sequence analysis unit 72 supplies the lost packet information as the specification information to the control information communication unit 75.

After Step S51, the process proceeds to Step S52. The communication state information generation unit 74 generates RTT information for calculating the RTT based on the packet supplied from the reception unit 71. The communication state information generation unit 74 generates the retransmitted packet information and the transmitted packet information supplied at Step S51 as the loss rate information. The communication state information generation unit 74 supplies the control information communication unit 75 with the RTT information and the loss rate information as the communication state information.

After Step S52, the process proceeds to Step S53. The control information communication unit 75 supplies the control information to the transmitter 11 via the network 12. The control information includes the specification information supplied at Step S51 and the communication state information supplied at Step S52. The process then terminates.

Referring now to FIG. 10, the following describes a control information reception process performed by the transmitter 11. The control information reception process starts, for example, when the control information communication unit 27 receives the control information transmitted from the control information communication unit 75 at Step S53 in FIG. 9. The control information communication unit 27 supplies the retransmission control unit 26 and the rate control unit 28 with the specification information out of the received control information and supplies the rate control unit 28 with the communication state information.

At Step S71, the rate control unit 28 calculates the RTT based on the RTT information out of the communication state information supplied from the control information communication unit 27. The process then proceeds to Step S72.

At Step S72, the retransmission control unit 28 reads the retransmission packet information from the retransmission packet information storage unit 29. The retransmission control unit 28 calculates a packet loss rate based on the retransmission packet information and based on the loss rate information of the communication state information and the specification information supplied from the control information communication unit 27.

After Step S72, the process proceeds to Step S73. The retransmission control unit 28 uses the RTT calculated at Step S71 and the packet loss rate calculated at Step S72 to calculate a transmission rate. The retransmission control unit 28 determines the coding rate based on the transmission rate and supplies the coding rate to the packet generation unit 22. At Step S1 in FIG. 6, the packet generation unit 22 generates a normal packet based on the coding rate.

In the transmission system 1 as mentioned above, the receiver 13 transmits the loss rate information. The transmitter 11 (the retransmission packet information storage unit 29 thereof) stores the retransmission packet information. The retransmission control unit 28 can also detects a lost retransmission packet. This makes it possible to accurately calculate the packet loss rate in consideration for lost retransmission packets. As a result, it is possible to control the transmission rate in consideration for retransmission packets.

The communication state information generation unit 74 may use the number of normal packets received by the reception unit 71 and the number of loss-detected normal packets to calculate the packet loss rate with no consideration for retransmission packets. The communication state information generation unit 74 may transmit the information indicating the packet loss rate as the loss rate information to the transmitter 11. In this case, transmitting retransmission packets decreases the number of normal packets to be transmitted. The packet loss rate may increase to slightly decrease the transmission rate. However, the system maintains the continuity of sequence numbers for the normal packets to be transmitted, making it possible to provide the stable throughput. The process of the receiver 13 is similar to a well-known process and is easily applicable to the well-known transmission system 1.

Referring now to FIGS. 11A, 11B, 12A, and 12B, the following describes another example how the retransmission control unit 26 updates the transmission packet buffer 53.

Figure 11A:
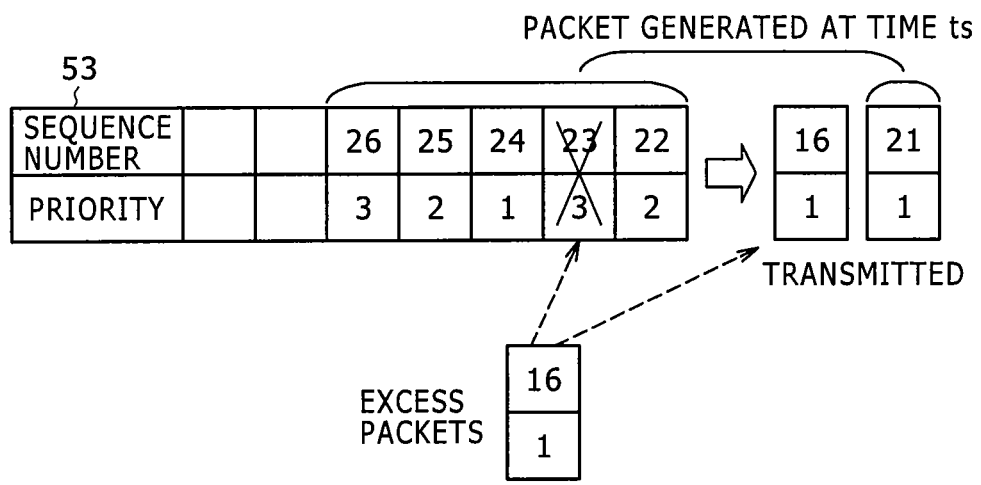
FIG. 11 shows still another example how the retransmission control unit updates the transmission packet buffer.
Figure 11B:
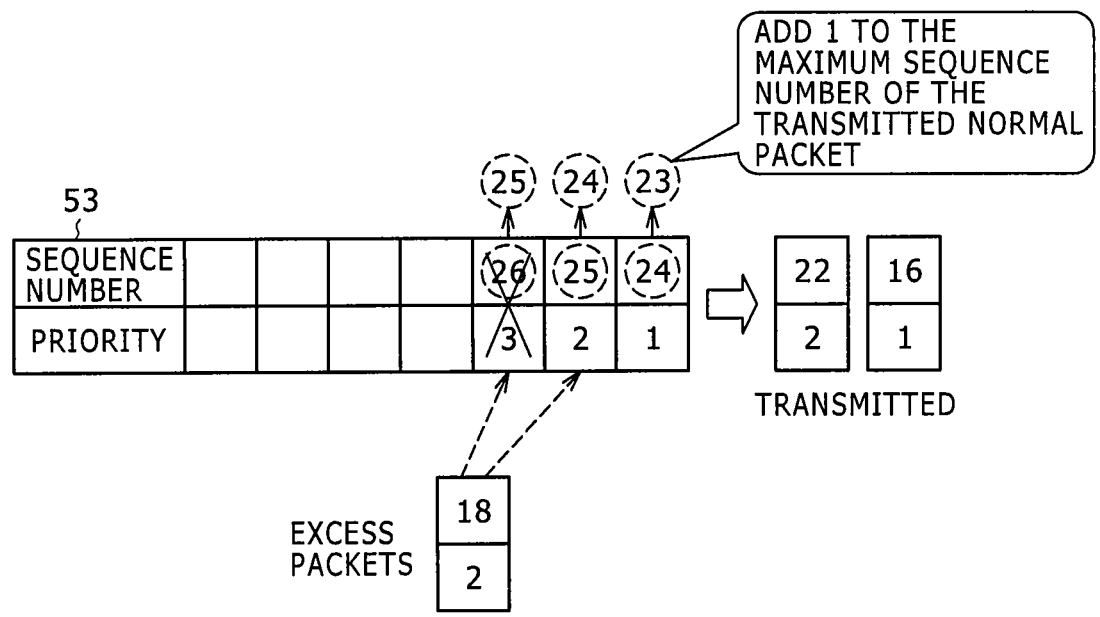

In FIGS. 11A and 11B, the packet generation unit 22 in FIG. 1 supplies six time-ts normal packets to the transmission buffer 23. The maximum value of 20 is assumed to be assigned to the sequence numbers of normal packets already transmitted by the transmission unit 30.

In FIG. 11A, the packet generation unit 22 determines transmission priorities of time-ts normal packets independently of the packet sequence.

The sequence control unit 24 provides time-ts normal packets with sequence numbers 21 through 26 according to the packet sequence so as to be consecutive to the maximum sequence number 20 for the already transmitted normal packets. The normal packet buffer 51 and the transmission packet buffer 53 of the transmission buffer 23 store the time-ts normal packets supplied from the packet generation unit 22 together with the corresponding sequence numbers and priorities.

As shown in FIG. 11A, the transmission unit 30 transmits the normal packet with sequence number 21 stored at the beginning of the transmission packet buffer 53 at the timing according to the transmission rate. Afterwards, the receiver 13 supplies the control information via the network 12 and the control information communication unit 27. The control information is composed of the specification information that specifies the normal packet with sequence number 16 as a packet requested for retransmission. The retransmission control unit 26 reads the priority and the normal packet that corresponds sequence number 16 and is stored in the normal packet buffer 51. The retransmission control unit 26 supplies the priority and the normal packet to the retransmission packet buffer 52.

The normal packet buffer 51 stores priorities for time-ts normal packets (the normal packets with sequence numbers 22 through 26) other than the already transmitted normal packet with sequence number 21. The retransmission packet buffer 52 stores priorities of retransmission packets. The retransmission control unit 26 updates the transmission packet buffer 53 based on these priorities.

Specifically, as shown in FIG. 11A, priority 1 is assigned to the retransmission packet with sequence number 16. Sequence number 22 is the smallest in those assigned to the time-ts normal packets other than the normal packet with sequence number 21 and priority 1. The retransmission control unit 26 allows the transmission packet buffer 53 to store the retransmission packet with sequence number 16 prior to the time-ts normal packet with sequence number 22. The retransmission control unit 26 removes the normal packet with sequence number 23, the smallest of those assigned to the normal packets that have the lowest priority 3 and are stored in the transmission packet buffer 53.

The sequence control unit 24 reassigns sequence numbers to untransmitted time-ts normal packets so that contiguous sequence numbers are assigned to the untransmitted time-ts normal packets stored in the transmission packet buffer 53. Specifically, the sequence control unit 24 sequentially reassigns sequence numbers to the normal packets subsequent to the removed normal packet from sequence number 23 of the removed normal packet. When the receiver 13 requests no retransmission at the next transmission timing, the transmission unit 30 transmits the normal packet with sequence number 22 at the beginning of the transmission packet buffer 53.

As shown in FIG. 11B, the sequence control unit 24 reassigns sequence number 23, 24, or 25 to the normal packet assigned with sequence number 24, 25, or 26 subsequent to the removed normal packet. The transmitted normal packet with sequence number 22 is removed from the transmission packet buffer 53.

As shown in FIG. 11B, the receiver afterwards supplies the control information, i.e., the specification information for specifying the normal packet with sequence number 18 as a packet requested for retransmission, via the network 12 and the control information communication unit 27. The retransmission control unit 26 then reads the priority and the normal packet corresponding to sequence number 18 stored in the normal packet buffer 51 and supplies the priority and the normal packet to the retransmission packet buffer 52.

The normal packet buffer 51 stores time-ts normal packets (normal packets with sequence numbers 23 through 25) other than the already transmitted normal packets with sequence numbers 21 and 22. The retransmission packet buffer 52 stores retransmission packets. Based on the priorities of the stored packets, the retransmission control unit 26 stores the retransmission packet with sequence number 18 prior to the time-ts normal packet with sequence number 25 in the transmission packet buffer 53. Sequence number 25 is the smallest of those assigned to time-ts normal packets that are less prioritized than the retransmission packet priority except the normal packets with sequence numbers 21 and 22. The retransmission control unit 26 removes the normal packet with sequence number 25, the smallest of those assigned to the normal packets that have the lowest priority 3 and are stored in the transmission packet buffer 53.

In this case, the transmission packet buffer 53 does not store normal packets following the removed normal packet with sequence number 25 according to the packet sequence. The sequence control unit 24 does not need to reassign sequence numbers.

Figure 12A:
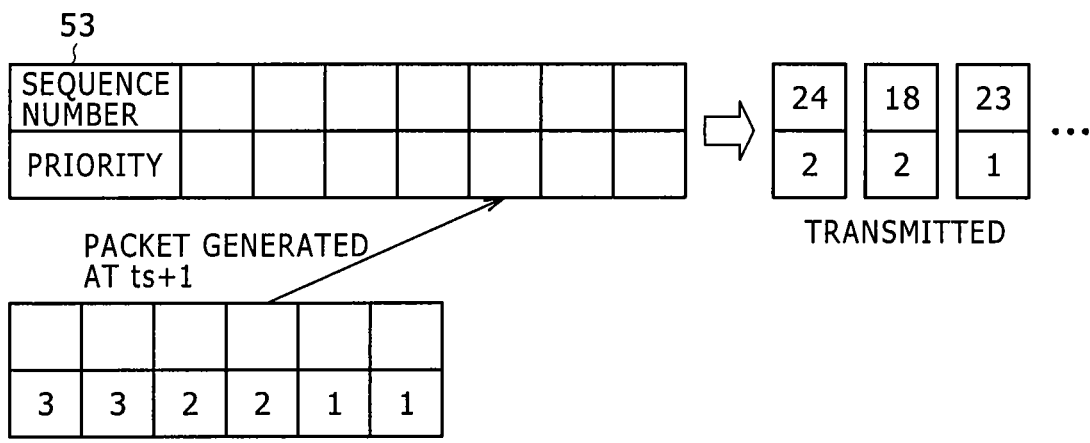
FIG. 12 shows yet another example how the retransmission control unit updates the transmission packet buffer.

After transmitting the normal packet with sequence number 22, the transmission unit 30, as shown in FIG. 12A, transmits the packets with sequence numbers 23, 18, and 24 stored in the transmission packet buffer 53. At time ts+1, the packet generation unit 22 supplies the transmission buffer 23 with six prioritized time ts+1 normal packets.

Figure 12B:
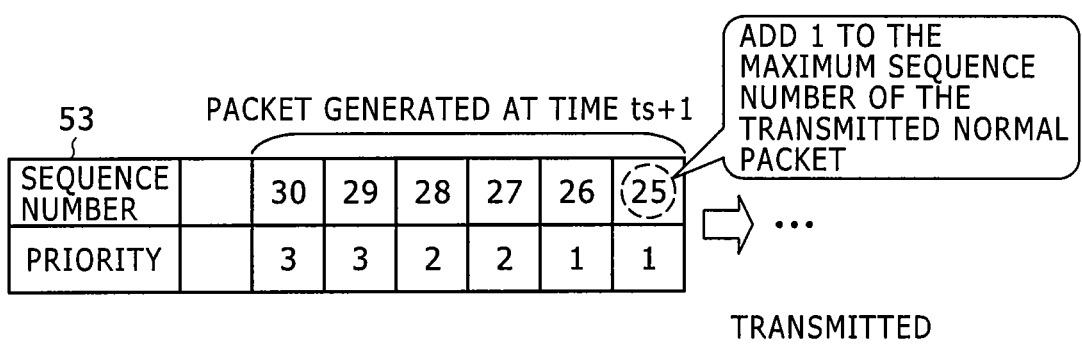

In this case, the transmission packet buffer 53 stores nothing, i.e., no excess packets. There is no need to remove excess packets. As shown in FIG. 12B, the sequence control unit 24 provides the time ts+1 normal packets with sequence numbers starting from 25 resulting from adding 1 to the maximum sequence number 24 for the transmitted normal packets according to the packet sequence. That is, sequence numbers 25 through 30 are assigned to the time ts+1 normal packets stored in the normal packet buffer 51. The normal packet buffer 51 and the transmission packet buffer 53 store the time ts+1 normal packets from the packet generation unit 22 as well as the corresponding priorities and sequence numbers.

In FIG. 12A, there is no excess packet. When there is an excess packet, the retransmission control unit 26 removes it.

It should be appreciated that the invention is not limited to the above-mentioned technique of selecting packets to be stored in or removed from the transmission packet buffer 53. It is also possible to use techniques in consideration for packet sizes or sequence numbers assigned to packets.

In the transmission system 1 as mentioned above, the sequence control unit 24 uses the sequence numbers stored in the normal packet information storage unit 25 to provide normal packets with sequence numbers so as to be consecutive to the sequence number of the most recently transmitted normal packet. The transmission unit 30 uses the transmission rate to select a normal packet or a retransmission packet. The transmission unit 30 assigns a sequence number to the selected packet and transmits it. The sequence analysis unit 72 uses the sequence number assigned to the received packet to detect a loss. The transmission system 1 can prevent congestion and a decrease in the transmission rate due to data retransmission.

The described embodiments are especially effective for a communication environment where a transmission rate variation or a packet loss frequently occurs and a large amount of packet is retransmitted, e.g., an environment that includes a radio network.

While the specification has described the steps of the program allowing a computer to perform various processes, the steps need not be always chronologically performed in accordance with the sequence represented as the flowchart. The specification includes processes that are performed parallel or individually (e.g., parallel processes or object-oriented processes).

The program may be performed by one computer or multiple computers in a distributed fashion. Further, the program may be transferred to a remote computer and may be performed there.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A transmission and reception system comprising:
a transmitter to packetize and transmit intermittently generated data; and
a receiver to receive the intermittently generated data, the receiver being separate from the transmitter, wherein the transmitter comprises:
at least one first processor; and
a memory device storing instructions, which when executed by the processor, cause the processor to:
(a) for a first plurality of packets generated at a first point in time, cause a normal packet buffer and a transmission packet buffer to store:
(i) a first untransmitted packet; and
(ii) a second untransmitted packet;
(b) provide:
(i) a first sequence number to the first untransmitted packet; and
(ii) a second sequence number to the second untransmitted packet;
(c) receive specification information for the receiver to specify a retransmission-requested packet;
(d) select the first untransmitted packet based on a specified transmission rate;
(e) transmit, from the transmission packet buffer, the selected first untransmitted packet;
(f) in response to a second plurality of packets being generated at a second point in time, remove the second untransmitted packet from the normal packet buffer and the transmission packet buffer such that the second untransmitted packet is removed from the normal packet buffer and the transmission packet buffer prior to ever being selected and transmitted; and
(g) after the second untransmitted packet is removed from the normal packet buffer and the transmission packet buffer:
(i) cause the normal packet buffer and the transmission packet buffer to store a third untransmitted packet; and
(ii) provide a third sequence number to the third untransmitted packet, wherein the third sequence number is consecutive to the first sequence number of the transmitted packet, wherein the transmitted packet is:
(A) the most recently transmitted packet; and
(B) different from the retransmission-requested packet;
wherein the receiver comprises:
(a) packet reception means for receiving a packet transmitted by the packet transmission means;
(b) detection means for using a number provided to a packet received by the packet reception means to detect a loss of the packet; and
(c) information transmission means for transmitting to the transmitter the specification information designating a packet whose loss is detected by the detection means.

2. A transmitter which packetizes intermittently generated data and transmits the same to a separate receiver, the transmitter comprising:
at least one processor; and
a memory device storing instructions, which when executed by the processor, cause the processor to:
(a) for a first plurality of packets generated at a first point in time, cause a normal packet buffer and a transmission packet buffer to store:
(i) a first untransmitted packet; and
(ii) a second untransmitted packet;
(b) provide:
(i) a first sequence number to the first untransmitted packet; and
(ii) a second sequence number to the second untransmitted packet;
(c) receive specification information for the receiver to specify a retransmission-requested packet;
(d) select the first untransmitted packet based on a specific transmission rate;
(e) transmit, from the transmission packet buffer, the selected first untransmitted packet;
(f) in response to a second plurality of packets being generated at a second point in time, remove the second untransmitted packet from the normal packet buffer and the transmission packet buffer such that the second untransmitted packet is removed from the normal packet buffer and the transmission packet buffer prior to ever being selected and transmitted; and
(g) after the second untransmitted packet is removed from the normal packet buffer and the transmission packet buffer:
(i) cause the buffer to store a third untransmitted packet; and (ii) provide a third sequence number to the third untransmitted packet, wherein the third sequence number is consecutive to the first sequence number of the transmitted packet, wherein the transmitted packet is:
   (A) the most recently transmitted packet; and
   (B) different from the retransmission-requested packet.

3. The transmitter of claim 2, wherein when executed by the processor, the instructions cause the processor to:
   (a) provide a first priority number to the first untransmitted packet and a second priority number to the second untransmitted packet, wherein the second priority number is lower than the first priority number; and
   (b) remove the second untransmitted packet from the buffer based on the second untransmitted packet having a lower priority sequence number.

4. The transmitter of claim 2, wherein when executed by the processor, the instructions cause the processor to:
   (a) determine a transmission rate;
   (b) receive loss information about a loss of a packet from the receiver;
   (c) determine the transmission rate based on the loss information; and
   (d) select the packet based on the determined transmission rate.

5. The transmitter of claim 4, wherein when executed by the processor, the instructions cause the processor to determine the transmission rate based on the loss information and a stored number.

6. The transmitter of claim 2, wherein when the most recently transmitted retransmission-requested packet is transmitted without causing an excess in the specified transmission rate.

7. A transmission method of a transmitter which packetizes intermittently generated data and transmits the data to a separate receiver, the transmission method comprising:
   (a) for a first plurality of packets generated at a first point in time, causing a normal packet buffer and a transmission packet buffer to store:
      (i) a first untransmitted packet; and
      (ii) a second untransmitted packet;
   (b) providing:
      (i) a first sequence number to the first untransmitted packet; and
      (ii) a second sequence number to the second untransmitted packet;
   (c) receiving specification information for the receiver to specify a retransmission-requested packet;
   (d) selecting the first untransmitted packet based on a specified transmission rate;
   (e) transmitting, from the transmission packet buffer, the selected first untransmitted packet;
   (f) in response to a second plurality of packets being generated at a second point in time, removing the second untransmitted packet from the normal packet buffer and the transmission packet buffer such that the second untransmitted packet is removed from the normal packet buffer and the transmission packet buffer prior to ever being selected and transmitted; and
   (g) after the second untransmitted packet is removed from the normal packet buffer and the transmission packet buffer:
      (i) causing the normal packet buffer and the transmission packet buffer to store a third untransmitted packet; and
      (ii) providing a third sequence number to the third untransmitted packet, wherein the third sequence number is consecutive to the first sequence number of the transmitted packet, wherein the transmitted packet is:
         (A) the most recently transmitted packet; and
         (B) different from the retransmission-requested packet.

8. A non-transitory computer readable storage medium storing a computer program for causing a computer to perform:
   (a) controlling a transmitter which packetizes intermittently generated data and transmits the data to a separate receiver;
   (b) for a first plurality of packets generated at a first point in time, causing a normal packet buffer and a transmission packet buffer to store:
      (i) a first untransmitted packet; and
      (ii) a second untransmitted packet;
   (c) providing:
      (i) a first sequence number to the stored first untransmitted packet; and
      (ii) a second sequence number to the stored second untransmitted packet;
   (d) receiving specification information for the receiver to specify a retransmission-requested packet;
   (e) selecting the first untransmitted packet based on a specified transmission rate;
   (f) transmitting, from the transmission packet buffer, the selected first untransmitted packet;
   (g) in response to a second plurality of packets being generated at a second point in time, removing the second untransmitted packet from the normal packet buffer and a transmission packet buffer such that the second untransmitted packet is removed from the normal packet buffer and a transmission packet buffer prior to ever being selected and transmitted; and
   (h) after the second untransmitted packet is removed from the buffer:
      (i) causing the normal packet buffer and a transmission packet buffer to store a third untransmitted packet; and
      (ii) providing a third sequence number to the third untransmitted packet, wherein the third sequence number is consecutive to the first sequence number of the transmitted packet, wherein the transmitted packet is:
         (A) the most recently transmitted packet; and
         (B) different from the retransmission-requested packet.

* * * * *